United States Patent
Sun et al.

(10) Patent No.: US 9,366,764 B2
(45) Date of Patent: Jun. 14, 2016

(54) VEHICULAR GPS/DR NAVIGATION WITH ENVIRONMENTAL-ADAPTIVE KALMAN FILTER GAIN

(71) Applicant: GENERAL MOTORS LLC, Detroit, MI (US)

(72) Inventors: Debo Sun, West Covina, CA (US); Curtis L. Hay, West Bloomfield, MI (US)

(73) Assignee: GENERAL MOTORS LLC, Detroit, MI (US)

(*) Notice: Subject to any disclaimer, the term of this patent is extended or adjusted under 35 U.S.C. 154(b) by 213 days.

(21) Appl. No.: 14/082,764

(22) Filed: Nov. 18, 2013

(65) Prior Publication Data

US 2015/0142311 A1    May 21, 2015

(51) Int. Cl.
  *G05D 1/02* (2006.01)
  *G06F 17/10* (2006.01)
  *G06G 7/78* (2006.01)
  *G01S 19/49* (2010.01)
  *G01C 21/16* (2006.01)
  *G01S 19/48* (2010.01)
  *G01C 21/12* (2006.01)
  *G01C 21/28* (2006.01)

(52) U.S. Cl.
  CPC .............. *G01S 19/49* (2013.01); *G01C 21/165* (2013.01); *G01C 21/12* (2013.01); *G01C 21/28* (2013.01); *G01S 19/48* (2013.01)

(58) Field of Classification Search
  CPC ...... G01C 21/12; G01C 21/165; G01C 21/28; G01C 21/30; G01C 21/206; G01S 19/14; G01S 19/20; G01S 19/22; G01S 19/23; G01S 19/28; G01S 19/40; G01S 19/41; G01S 19/44; G01S 19/46; G01S 19/47; G01S 19/48; G01S 19/49; G01S 19/51; G01S 5/0263

USPC ......... 701/300, 457, 468, 469, 470, 472, 479; 342/357.21, 357.22, 357.23, 357.24, 342/357.27, 357.31, 357.56
See application file for complete search history.

(56) References Cited

U.S. PATENT DOCUMENTS

| | | | |
|---|---|---|---|
| 5,416,712 A * | 5/1995 | Geier et al. | 701/472 |
| 6,453,238 B1 * | 9/2002 | Brodie et al. | 701/472 |
| 7,184,887 B2 * | 2/2007 | Wood et al. | 701/469 |
| 8,462,745 B2 * | 6/2013 | Alizadeh-Shabdiz | 370/338 |
| 2009/0058723 A1 * | 3/2009 | Mao | 342/357.13 |
| 2009/0132164 A1 * | 5/2009 | Goodall et al. | 701/213 |

(Continued)

OTHER PUBLICATIONS

Cui et al. "Autonomous Vehicle Positioning With GPS in Urban Canyon Environments", 2003, IEEE.*

*Primary Examiner* — Jason Holloway
*Assistant Examiner* — Rachid Bendidi
(74) *Attorney, Agent, or Firm* — Leydig, Voit & Mayer, Ltd.

(57) ABSTRACT

A method is provided for estimating position using an integrated Global Navigation Satellite System (GNSS)/dead reckoning (DR) (GNSS/DR) navigation system in a vehicle. The method includes: determining a current environment of the vehicle from a plurality of environments based on at least one parameter; calculating a Kalman filter-related parameter based on the determined current environment, wherein the Kalman filter-related parameter corresponds to a representation of weight given to GNSS navigation and DR navigation relative to one another; and estimating a position of the vehicle based on the calculated Kalman filter-related parameter utilizing a Kalman filter.

16 Claims, 5 Drawing Sheets

(56) References Cited

U.S. PATENT DOCUMENTS

| | | |
|---|---|---|
| 2009/0140924 A1* | 6/2009 | Mizuochi et al. ............. 342/451 |
| 2010/0097268 A1* | 4/2010 | Roh ......................... 342/357.04 |
| 2011/0071759 A1* | 3/2011 | Pande et al. .................. 701/213 |
| 2011/0106449 A1* | 5/2011 | Chowdhary et al. .......... 701/214 |
| 2011/0144911 A1* | 6/2011 | Madhavan et al. ............ 701/214 |
| 2012/0221244 A1* | 8/2012 | Georgy et al. ................ 701/472 |
| 2013/0158857 A1* | 6/2013 | Dutta et al. ................... 701/409 |
| 2014/0057649 A1* | 2/2014 | Han et al. ................... 455/456.1 |

\* cited by examiner

VEHICULAR GPS/DR NAVIGATION WITH ENVIRONMENTAL-ADAPTIVE KALMAN FILTER GAIN

FIELD

The present disclosure relates generally to vehicle telematics systems and more particularly to vehicular navigation using integrated satellite and dead reckoning navigation systems.

BACKGROUND

Telematics units within mobile vehicles provide subscribers with connectivity to a telematics service provider (TSP). The TSP provides subscribers with an array of services ranging from emergency call handling and stolen vehicle recovery to diagnostics monitoring, global navigation system aided position identification, map services, and turn-by-turn navigation assistance. Telematics units are often provisioned and activated at a point of sale when a subscriber purchases a telematics-equipped vehicle. Upon activation, the telematics unit can be utilized to provide a subscriber with telematics services such as those described herein.

One telematics service provided by TSPs is a Global Navigation Satellite System (GNSS) based navigation service. GNSS is a generic term referring to any of multiple satellite constellation-based global positioning networks including, for example, the Global Positioning System (GPS) constellation. Another GNSS constellation network is the Global Navigation Satellite System (GLONASS). A particular example of a GNSS based navigation service is one providing turn-by-turn (TBT) directions to a telematics unit based upon a specified destination and current conditions including the current location of the telematics unit. Several other GNSS systems are currently under development and are capable of providing at least partial positioning functionality.

Navigation-related services may be provided to vehicles using a combination of GNSS-based navigation services in combination with a dead reckoning (DR) measurement system. DR measurement involves calculating a current position based on a previously known position using known speed and heading information since the previously known position was determined.

The above body of information is provided for the convenience of the reader. The foregoing describes a suitable environment for which the described system and method are provided, and is not an attempt to review or catalog the prior art.

SUMMARY

In an implementation, the invention provides a method for estimating position using an integrated Global Navigation Satellite System (GNSS)/dead reckoning (DR) (GNSS/DR) navigation system in a vehicle. The method includes: determining a current environment of the vehicle from a plurality of environments based on at least one parameter; calculating a Kalman filter-related parameter based on the determined current environment, wherein the Kalman filter-related parameter corresponds to a representation of weight given to GNSS navigation and DR navigation relative to one another; and estimating a position of the vehicle based on the calculated Kalman filter-related parameter utilizing a Kalman filter.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

For an integrated Global Positioning System (GPS)/dead reckoning (DR) navigation system, the GPS positioning information obtained from a GPS receiver generally has more noise (e.g., due to signal propagation through different media, signal reflection off of buildings, etc.), but less bias compared to the DR system. On the other hand, the DR system has less noise but more bias (e.g., due to miscalibration or built-in equipment biases) relative to the GPS system. To take advantage of the information provided by both the GPS system and the DR system in an integrated GPS/DR navigation system, a Kalman filter is generally used to fuse the measurements from the GPS system and the DR system.

In the integrated GPS/DR navigation system, Kalman filter gain is calculated based on DR and GPS measurement errors. The accuracy of the system is related to the accuracy of the DR error model and the GPS measurement error model. Generally it is difficult to get an accurate DR error model and an accurate GPS measurement error model because of variations in road conditions and especially due to variations in GPS signal environments. With an inaccurate DR error model and/or an inaccurate GPS measurement error model, it is difficult to determine an appropriate Kalman filter gain, which generally causes position errors or worsens position errors in the GPS/DR navigation system.

For example, if the Kalman filter gain used by the system is larger than what would be an optimal value for the Kalman filter gain, the Kalman filter will take relatively more information from GPS and relatively less information from DR than is optimal. In this case, the performance of the GPS/DR navigation system will likely be degraded in urban canyon environments due to the poor performance of GPS receivers in urban canyon environments.

Conversely, if the Kalman filter gain used by the system is smaller than what would be an optimal Kalman filter gain, the Kalman filter will take relatively more information from DR and relatively less information from GPS than is optimal. In this case, the performance of the GPS/DR navigation system may be suitable for urban canyon environments, but suboptimal for other environments (e.g., open sky environments where the GPS receiver performs well).

Generally speaking, larger Kalman filter gain values will give a GPS/DR navigation system better performance under favorable GPS receiver conditions, while smaller Kalman filter gain values will give a GPS/DR navigation system better performance under poor GPS receiver conditions.

To give a GPS/DR navigation system better or favorable performance in a variety of environments, implementations of the invention vary the Kalman filter gain with varying environments, so as to use a suitable Kalman filter gain according to the circumstances. For example, in an urban canyon environment, GPS measurement noise parameters should be set to be relatively larger, which results in a smaller Kalman filter gain. In an open sky environment, the GPS measurement noise parameter should be set to be relatively smaller, resulting in a larger Kalman filter gain.

According to implementations of the invention, the environment is identified by the GPS/DR navigation system using one or more variables. These variables include:

Speed—a speed measurement obtained by the GPS/DR navigation system that exceeds a certain threshold can generally be used to identify an open sky environment. For example, if the speed of a vehicle is greater than 75 km/h, it is generally a safe assumption that the vehicle is travelling in an open sky environment (because vehicles are generally unable to travel faster than 75 km/h in urban canyon environments).

Number of Tracked Satellites—within a given cut-off angle, if the number of tracked satellites in view (as seen by a GPS receiver) is much less than the number of satellites that should theoretically be in view (according to GPS satellite system data obtained by the GPS receiver), it can be inferred that the vehicle is in an urban canyon environment (e.g., an area of a city having tall buildings).

Dilution of Precision (DOP)—DOP corresponds to the quality of the geometry of satellites in view of the GPS receiver. A high DOP value indicates that a vehicle is in a challenging environment (e.g., the satellites have an unfavorable geometry relative to the vehicle or the vehicle is in an urban canyon and does not have many satellites in view), suggesting that GPS measurement noise will also be high. It will be appreciated that Horizontal DOP (HDOP) values may be used as the DOP values for a vehicular GPS/DR navigation system.

DOP information is generally already accounted for in the Kalman filter of a GPS/DR navigation system, particularly for a tight integration GPS/DR system (e.g., which uses "raw" data from GPS satellites and accepts DOP as an input to the Kalman filter). In implementations of a tightly integrated GPS/DR system, the DOP value is incorporated in the measurement matrix of the Kalman filter, and only the pseudorange measurement error (which is environment-dependent) is chosen. In an example, pseudorange measurement error corresponds to a range of distance (i.e., +/− an amount relative to a received distance-from-satellite measurement) that corresponds to the degree of confidence in a distance measurement (i.e., the +/− amount is lower in magnitude with high confidence and higher in magnitude with low confidence).

Implementations of a loose integration GPS/DR system (e.g., which uses positioning and speed data from a GPS receiver) might not use DOP as an input to the Kalman filter. In the loose integration system, the DOP can instead be used to calculate the positioning error of the GPS receiver, for example, according to the equation:

Positioning Error=DOP×Pseudorange Error

Further, the pseudorange measurement error parameter also can be adjusted using pseudorange residual error parameters. Additionally, the pseudorange residual error can be used as an initial value for the pseudorange measurement error parameters. Then, the parameters are adjusted according to the environment.

It will be appreciated that even if the degree of confidence is high with respect to the measurement error parameter with respect to GPS readings (i.e., the GPS readings are determined to be reliable), the confidence with respect to DR positioning information provided by DR readings should also be assessed as accurately as possible to ensure optimal operation of the GPS/DR system. The degree of error associated with the DR positioning system can be classified into different DR error modes, corresponding to different environments. If the DR error mode is not known very well, the performance of GPS/DR still can be degraded even if the pseudorange measurement error is known very well.

In general terms, not intended to limit the claims, implementations of the invention provide for identifying an environment based on one or more variables, and, based on the identified environment, adjusting one or more appropriate parameters (such as a pseudorange measurement error parameter) to obtain an environment-based Kalman filter gain value that gives optimal weights to the GPS positioning and DR positioning systems in the Kalman filter.

Although exemplary implementations of the invention are described herein in the context of vehicular navigation, it will be appreciated that the principles described herein are not limited to vehicles, but are particularly applicable to apparatuses including a telematics unit having an integrated geographic location positioning subsystem such as, for example, a Global Navigation Satellite System (GNSS) receiver capable of selectively receiving/processing GNSS signals from multiple GNSS constellations, as well as a dead reckoning (DR) navigation system. Examples of potentially selectable GNSS constellations include GPS and GLONASS to name just two.

Figure 1:
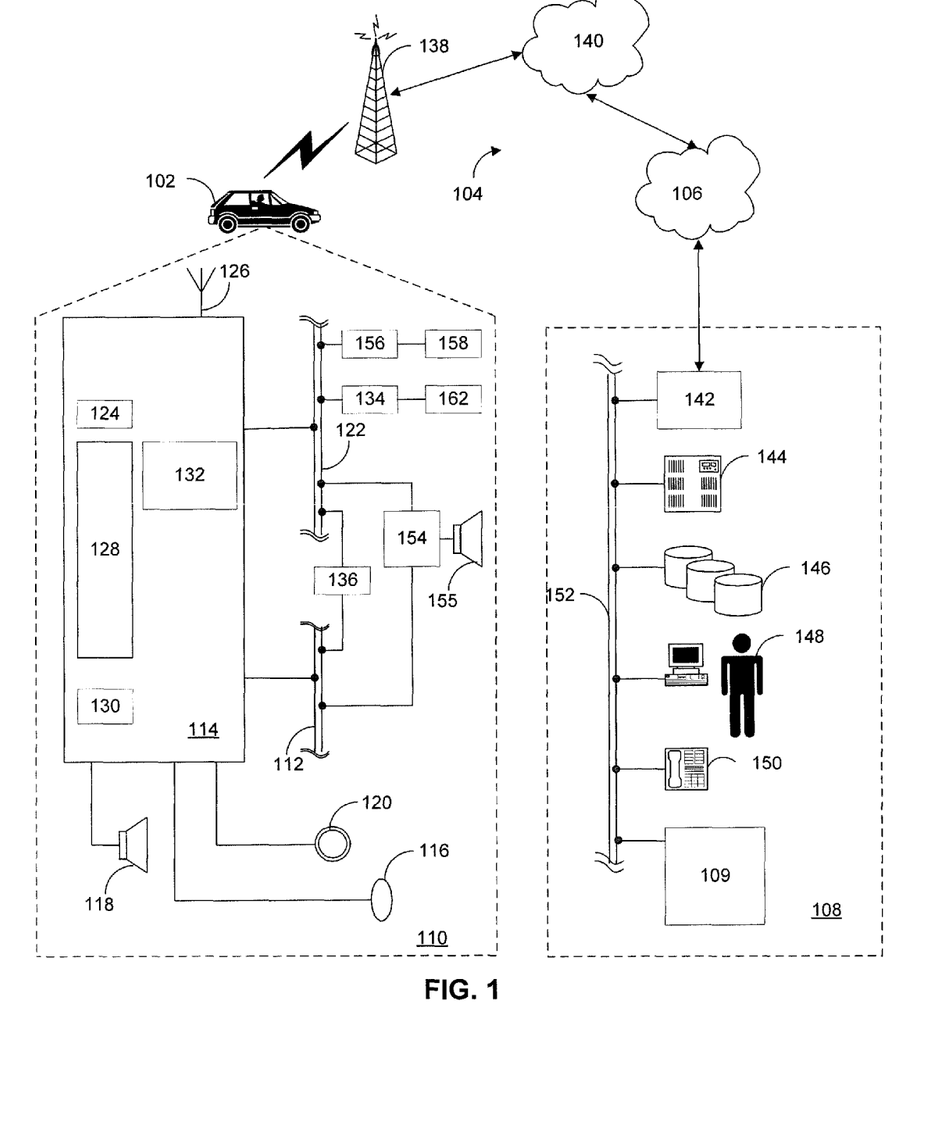
FIG. 1 is a schematic diagram of an operating environment for a mobile vehicle communication system usable in implementations of the described principles.

An exemplary computing and network communications environment is described hereinafter. It will be appreciated that the described environment is an example, and does not imply any limitation regarding the use of other environments to practice the invention. With reference to FIG. 1 there is shown an example of a communication system 100 that may be used with the present method and system and generally includes a vehicle 102, a mobile wireless network system 104, a land network 106 and a communications center 108. It should be appreciated that the overall architecture, setup and operation, as well as the individual components of the communication system 100 is generally known in the art. In accordance with an illustrative example, the communication center 108 includes a GNSS control center 109 incorporating functional components facilitating over-the-air configuration of GNSS receivers integrated with/within telematics units such as a telematics unit 114. Thus, the following paragraphs provide a brief overview of an exemplary communication system 100. However, other systems are contemplated that are capable of incorporating the described GNSS receiver and GNSS control center functionality described herein.

The vehicle 102 is, for example, a motorcycle, a car, a truck, a recreational vehicle (RV), a boat, a plane, etc. The vehicle 102 is equipped with suitable hardware and software that configures/adapts the vehicle 102 to facilitate communications with the communications center 108 via mobile wireless communications. The vehicle 102 includes hardware 110 such as, for example, the telematics unit 114, a microphone 116, a speaker 118 and buttons and/or controls 120 integrated with the telematics unit 114.

The telematics unit 114 is communicatively coupled, via a hard wire connection and/or a wireless connection, to a vehicle bus 122 for supporting communications between electronic components within the vehicle 102. Examples of suitable network technologies for implementing the vehicle bus 122 in-vehicle network include a controller area network (CAN), a media oriented system transfer (MOST), a local interconnection network (LIN), an Ethernet, and other appropriate connections such as those that conform with known ISO, SAE, and IEEE standards and specifications.

The telematics unit 114 provides a variety of services through communications with the communications center 108. The telematics unit 114 includes an electronic processor 128, electronic memory 130, a mobile wireless component 124 including a mobile wireless chipset, a dual function antenna 126 (both GNSS and mobile wireless signal), and a GNSS component 132 including a GNSS chipset. In one example, the mobile wireless component 124 comprises an electronic memory storing a computer program and/or set of computer-executable instruction sets/routines that are transferred to, and executed by, the processing device 128. The mobile wireless component 124 constitutes a network access device (NAD) component of the telematics unit 114.

The telematics unit 114 provides, for users, an extensive/extensible set of services. Examples of such services include: GNSS-based mapping/location identification, turn-by-turn directions and other navigation-related services provided in conjunction with the GNSS component 132; and airbag deployment notification and other emergency or roadside assistance-related services provided in connection with various crash and or collision sensor interface modules 156 and crash sensors 158 located throughout the vehicle.

GNSS navigation services are, for example, implemented based on the geographic position information of the vehicle provided by the GNSS component 132. A user of the telematics unit 114 enters a destination, for example, using inputs associated with the GNSS component 132, and a route to a destination may be calculated based on the destination address and a current position of the vehicle determined at approximately the time of route calculation. Turn-by-turn (TBT) directions may further be provided on a display screen corresponding to the GNSS component and/or through vocal directions provided through a vehicle audio component 154. It will be appreciated that the calculation-related processing may occur at the telematics unit or may occur at a communications center 108.

The telematics unit 114 also supports infotainment-related services whereby music, Web pages, movies, television programs, video games and/or other content is downloaded by an infotainment center 136 operatively connected to the telematics unit 114 via the vehicle bus 122 and an audio bus 112. In one example, downloaded content is stored for current or later playback.

The above-listed services are by no means an exhaustive list of the current and potential capabilities of the telematics unit 114, as should be appreciated by those skilled in the art. The above examples are merely a small subset of the services that the telematics unit 114 is capable of offering to users. Moreover, the telematics unit 114 includes a number of known components in addition to those listed above that have been excluded since they are not necessary to understanding the functionality discussed herein below.

Vehicle communications use radio transmissions to establish a communications channel with the mobile wireless network system 104 so that both voice and data signals can be sent and received via the communications channel. The mobile wireless component 124 enables both voice and data communications via the mobile wireless network system 104. The mobile wireless component 124 applies encoding and/or modulation functions to convert voice and/or digital data into a signal transmitted via the dual function antenna 126. Any suitable encoding or modulation technique that provides an acceptable data rate and bit error can be used. The dual function antenna 126 handles signals for both the mobile wireless component 124 and the GNSS component.

The microphone 116 provides the driver or other vehicle occupant with a means for inputting verbal or other auditory commands, and can be equipped with an embedded voice processing unit utilizing a human/machine interface (HMI) technology known in the art. The speaker 118 provides verbal output to the vehicle occupants and can be either a stand-alone speaker specifically dedicated for use with the telematics unit 114 or can be part of an audio component 154. In either case, the microphone 116 and the speaker 118 enable the hardware 110 and the communications center 108 to communicate with occupants of the vehicle 102 through audible speech.

The hardware 110 also includes the buttons and/or controls 120 for enabling a vehicle occupant to activate or engage one or more components of the hardware 110 within the vehicle 102. For example, one of the buttons and/or controls 120 can be an electronic push button used to initiate voice communication with the communications center 108 (whether it be live advisors 148 or an automated call response system). In another example, one of the buttons and/or controls 120 initiates/activates emergency services supported/facilitated by the telematics unit 114.

The audio component 154 is operatively connected to the vehicle bus 122 and the audio bus 112. The audio component 154 receives analog information via the audio bus, and renders the received analog information as sound. The audio component 154 receives digital information via the vehicle bus 122. The audio component 154 provides AM and FM radio, CD, DVD, and multimedia functionality independent of the infotainment center 136. The audio component 154 may contain a speaker system 155, or may utilize the speaker 118 via arbitration on the vehicle bus 122 and/or the audio bus 112.

The vehicle crash and/or collision detection sensor interface 156 is operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

A set of vehicle sensors 162, connected to various ones of a set of sensor interface modules 134 are operatively connected to the vehicle bus 122. Examples of the vehicle sensors 162 include but are not limited to gyroscopes, accelerometers, magnetometers, emission detection and/or control sensors, and the like. Examples of the sensor interface modules 134 include ones for power train control, climate control, and body control. Further, it will be appreciated that the processor 128, electronic memory 130, and vehicle sensors 162 are capable of being used together as a dead reckoning (DR) navigation system, where according to instructions stored on the electronic memory 130 executed by the processor 128, the telematics unit 114 is able to estimate a relative vehicle position based on distance and heading measurements obtained from the sensors 162. The DR system may include, for example, wheel sensors and heading gyros, or wheel sensors with differential wheel tick (DWT) technology. Other forms of DR navigation are contemplated as well.

The mobile wireless network system 104 is, for example, a cellular telephone network system or any other suitable wireless system that transmits signals between mobile wireless devices, such as the telematics unit 114 of the vehicle 102, and land networks, such as the land network 106. In the illustrative example, the mobile wireless network system 104 includes a set of cell towers 138, as well as base stations and/or mobile switching centers (MSCs) 140, as well as other networking components facilitating/supporting communications between the mobile wireless network system 104 with the land network 106. For example, the MSC 140 includes a remote data server.

As appreciated by those skilled in the art, the mobile wireless network system includes various cell tower/base station/MSC arrangements. For example, a base station and a cell tower could be co-located at the same site or they could be remotely located, and a single base station could be coupled to various cell towers or various base stations could be coupled with a single MSC, to name but a few of the possible arrangements.

Land network 106 can be, for example, a conventional land-based telecommunications network connected to one or more landline end node devices (e.g., telephones) and connects the mobile wireless network system 104 to the communications center 108. For example, land network 106 includes a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

The communications center 108 is configured to provide a variety of back-end services and application functionality to the hardware 110. The communications center 108 includes, by way of example, network switches 142, servers 144, databases 146, live advisors 148, as well as a variety of other telecommunications equipment 150 (including modems) and computer/communications equipment known to those skilled in the art. These various call center components are, for example, coupled to one another via a network link 152 (e.g. a physical local area network bus and/or a wireless local network, etc.). Switch 142, which can be a private branch exchange (PBX) switch, routes incoming signals so that voice transmissions are, in general, sent to either the live advisors 148 or an automated response system, and data transmissions are passed on to a modem or other component of the telecommunications equipment 150 for processing (e.g., demodulation and further signal processing).

The telecommunications equipment 150 includes, for example, an encoder, and can be communicatively connected to various devices such as the servers 144 and the databases 146. For example, the databases 146 comprise computer hardware and stored programs configured to store subscriber profile records, subscriber behavioral patterns, and other pertinent subscriber information. Although the illustrated example has been described as it would be used in conjunction with a manned version of the communications center 108, it will be appreciated that the communications center 108 can be any of a variety of suitable central or remote facilities, which are manned/unmanned and mobile/fixed facilities, to or from which it is desirable to exchange voice and data.

It will be appreciated by those of skill in the art that the execution of the various machine-implemented processes and steps described herein may occur via the computerized execution of computer-executable instructions stored on a tangible computer-readable medium, e.g., RAM, ROM, PROM, volatile, nonvolatile, or other electronic memory mechanism. Thus, for example, the operations performed by the telematics unit may be carried out according to stored instructions or applications installed on the telematics unit, and operations performed at the call center may be carried out according to stored instructions or applications installed at the call center.

Figure 2:
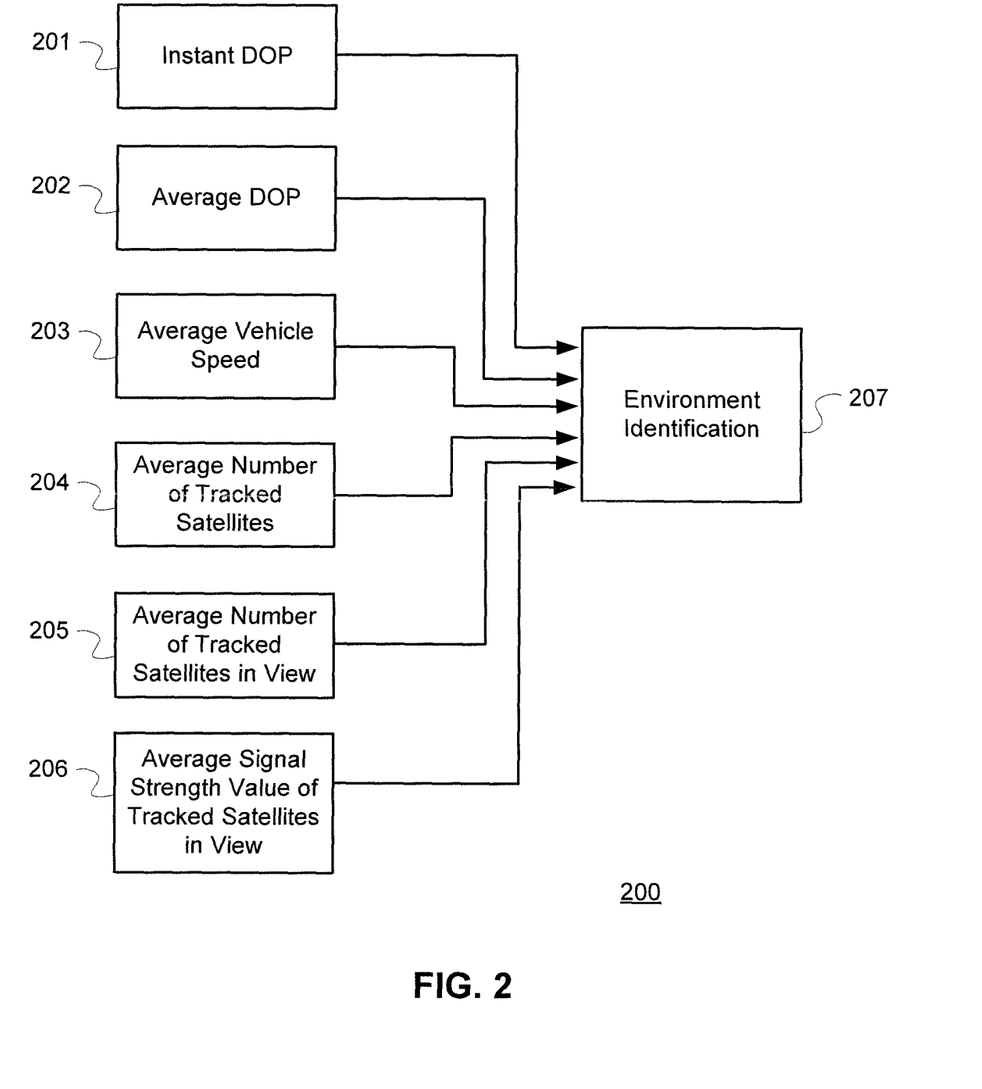
FIG. 2 is a block diagram illustrating exemplary parameters used to determine a vehicle environment in an exemplary implementation.

With further reference to the architecture of FIG. 1, and turning more specifically to FIG. 2, an exemplary block diagram 200 is depicted that illustrates specific parameters that may be used in environment identification 207 in an implementation of the invention. These parameters include:

Instant DOP (DOP) 201—the DOP value at a particular instant in time;

Average DOP ($\overline{DOP}$) 202—the average DOP value over a period of time (e.g., one minute);

Average Vehicle Speed ($\overline{V}$) 203—the average measured vehicle speed over a period of time (e.g., one minute);

Average Number of Tracked Satellites ($\overline{N}_s$) 204—the average number of tracked satellites that should be available to the vehicle within a given cut-off angle;

Average Number of Tracked Satellites in View ($\overline{N}_{s0}$) 205—the average number of tracked satellites that are actually in view of the vehicle within the given cut-off angle; and Average Signal Strength Value of All Tracked Satellites in View ($\overline{C/N}_0$) 206.

The parameters described above that are used in this exemplary implementation work well with respect to the methods provided herein for identifying an environment. However, it will be appreciated that in other implementations, other specific parameters may be used to identify the environment. One skilled in the art can vary the types of parameters and the criteria for identification without departing from the inventive principles described herein.

Figure 3:
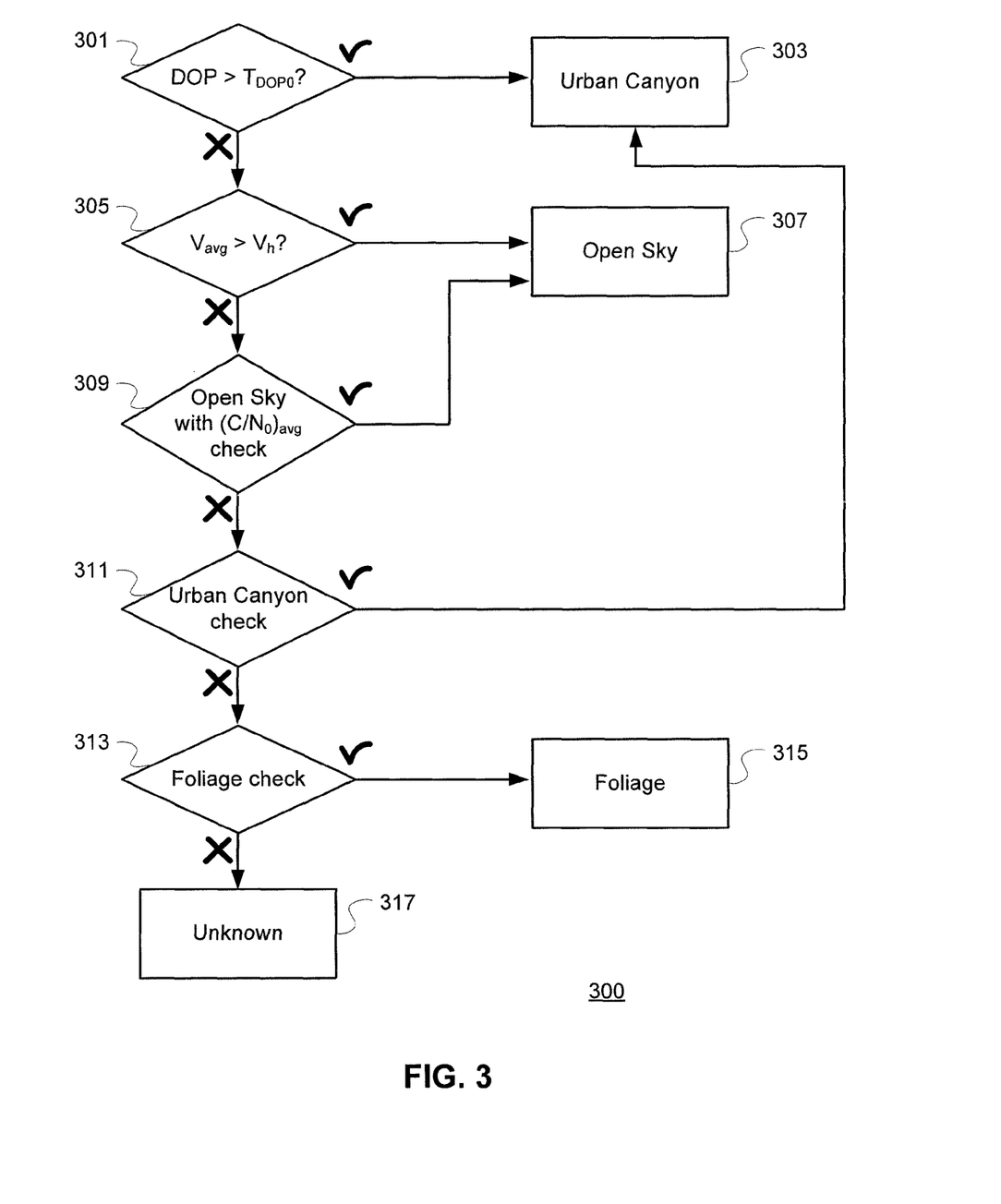
FIG. 3 is a flowchart illustrating an exemplary process for determining a vehicle environment in an exemplary implementation.

FIG. 3 depicts a flowchart 300 that illustrates an exemplary process for environment determination in an implementation of the invention. In this implementation, the process distinguishes between three typical kinds of GPS environments: open sky, urban canyon (including other GPS-challenged environments such as tunnels), and foliage. Using the specific parameters depicted in FIG. 2, process 300 includes a series of stages that are used to classify the current environment as one of the three types. Although these determinations are depicted in a particular order with respect to process 300, one skilled in the art will appreciate that the depicted stages can be performed in other orders in other implementations of the invention.

At stage 301, an instant DOP value is compared to an instant DOP threshold value $T_{DOP0}$, which allows for immediate identification of a severely GPS-challenged urban canyon environment such as a tunnel (stage 303) if the instant DOP value is greater than the instant DOP threshold value. In one example, an exemplary value for $T_{DOP0}$ is chosen to be 15. Further, it will be appreciated that the instant DOP value and the instant DOP threshold value may actually be HDOP values.

If the instant DOP value is not greater than the instant DOP threshold value ($T_{DOP0}$) at stage 301, the process 300 continues to a determination of whether average vehicle speed $\overline{V}$ is greater than a threshold average vehicle speed $V_h$ at stage 305. If the average vehicle speed $\overline{V}$ is greater than threshold average vehicle speed $V_h$ at stage 305, the environment is determined as being open sky (stage 307). In one example, an exemplary value for $V_h$ is 75 km/h.

If the average vehicle speed $\overline{V}$ is not greater than threshold average vehicle speed $V_h$ at stage 305, the environment may still nonetheless be determined as open sky (stage 307) if an "open sky check with $\overline{C/N}_0$" algorithm is passed at stage 309. This "open sky check with $\overline{C/N}_0$" algorithm is based on average DOP $\overline{DOP}$, average number of tracked satellites $\overline{N}_s$, average number of tracked satellites in view $\overline{N}_{s0}$, and average GPS signal strength of all tracked satellites $\overline{C/N}_0$. The "open sky check" algorithm in this implementation determines: (1) if $\overline{DOP}$ is less than a threshold average DOP ($T_{DOP1}$); (2) if $\overline{N}_s - \overline{N}_{s0}$ is less than a threshold number of satellites ($T_{Ns1}$); and (3) if $\overline{C/N}_0 > T_{cn1}$, where $T_{cn1}$ is a threshold signal strength, and where $\overline{C/N}_0$ is calculated according to the following equation:

$$\overline{C/N}_0 = \frac{1}{T} \sum_{t_i=0}^{T} \left( \frac{1}{N_s} \sum_{N=1}^{N_s} C/N_0(N, t_i) \right)$$

where T is the average time period, $N_s$ is the number of tracked satellites at time $t_i$, and $C/N_0(N, t_i)$ is the GPS signal strength (carrier to noise ratio) of the satellite N at time $t_i$. If all three of these conditions are met in the "open sky check with $\overline{C/N}_0$" at stage 309, the environment is determined as being open sky (stage 307). In one example, an exemplary value for $T_{DOP1}$ is chosen to be 1.0 (HDOP), an exemplary value for $T_{Ns1}$ is chosen to be 3, and an exemplary value for $T_{cn1}$ is chosen to be 40 dB-Hz. Further, in this exemplary implementation, $T_{DOP1}$ is also used in the "urban canyon check" at stage 311 and the "foliage check" at stage 313, and is thus the exemplary value is chosen to be relatively low to more efficiently separate open sky and foliage environments from an urban canyon environment when the average speed is low.

If one or more of the conditions of the "open sky with $\overline{C/N}_0$" check at stage 309 are not met, the process moves on to an "urban canyon check" at stage 311. The "urban canyon check" algorithm in this implementation includes determining if $\overline{DOP} \geq T_{DOP1}$ and if $\overline{N}_{s0} - \overline{N}_s \geq T_{Ns1}$. If both of these conditions are met, the environment is determined to be an urban canyon (stage 303).

If one or both of these conditions of the "urban canyon check" of stage 311 are not met, the process 300 moves on to a "foliage check" at stage 313. The "foliage check" algorithm in this implementation includes determining if $\overline{DOP} < T_{DOP1}$, if $\overline{N}_{s0} - \overline{N}_s < T_{Ns1}$, and if $\overline{C/N}_0 \leq T_{cn1}$. If all three of these conditions are met, the environment is determined to be foliage (stage 315). If one or more of these three conditions is not met, the environment is classified as unknown (stage 317).

Thus, the exemplary implementation depicted in FIG. 3 provides a navigation system that uses instant DOP information to identify tunnel or other severe GPS-challenged environments (classified as urban canyons). This allows for an immediate Kalman filter response to the obtained instant DOP information. If this criteria for immediate identification of an urban canyon is not met, the open sky case can be identified using average vehicle speed if average vehicle speed is high. If average vehicle speed is low, it is still possible that the environment is open sky, but additional information including average DOP, tracked satellites, and GPS signal strength is used to identify the open sky environment through the "open sky with $\overline{C/N}_0$ check." If the vehicle speed is low and the environment is not identified as open sky by the "open sky with $\overline{C/N}_0$ check," the navigation system then performs an "urban canyon check" to determine whether the environment is an urban canyon (based on poor average DOP and a relatively low number of satellites in view). If the urban canyon check does not identify the environment, the navigation system then performs a "foliage check" that determines whether the environment is foliage (based on average GPS signal strength being low while DOP and tracked satellites in view are at relatively favorable or normal levels). If the environment cannot be identified as open sky, foliage, or urban canyon, the navigation system classifies the environment as being what will be classified as an unknown environment.

It is noted that when the speed is low, the "open sky with $\overline{C/N}_0$ check" and the "foliage check" are similar except with respect to the $\overline{C/N}_0$ parameter: average $\overline{C/N}_0$ of a foliage environment should be lower than average $\overline{C/N}_0$ of an open sky environment. In addition, the period of average time for input variables affects the performance of the environment identification. Generally the longer the average period, the higher the correctness rate of the environment identification. However, longer averaging periods also result in longer response times. As a result, the period of time over which to calculate averages is chosen accordingly to balance the competing considerations of correctness rate versus response time. Further, as described above, it will be appreciated that HDOP measurements may be used as DOP measurements.

Figure 4:
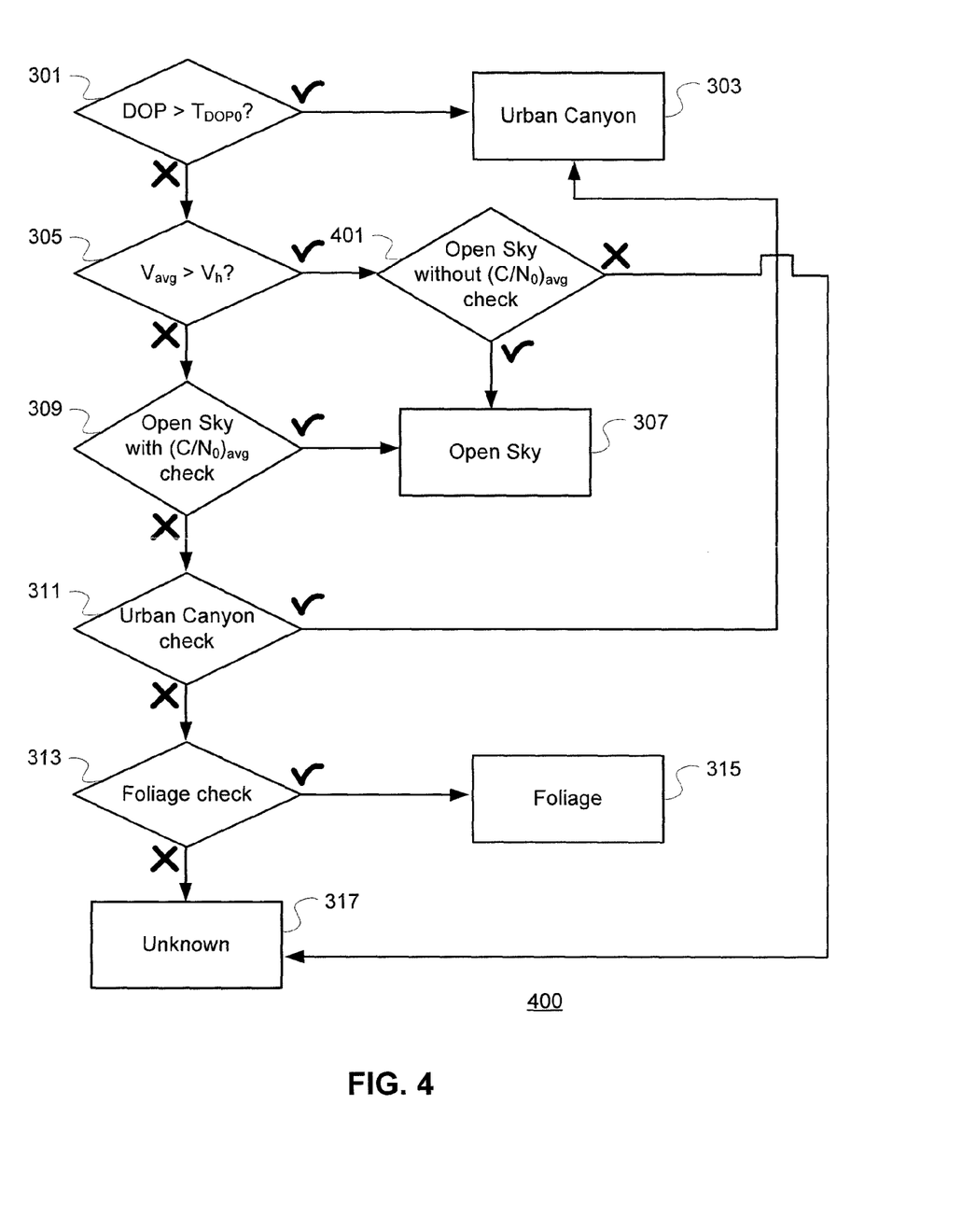
FIG. 4 is a flowchart illustrating an exemplary process for determining a vehicle environment in another exemplary implementation.

FIG. 4 shows an exemplary variation of process 300 including an additional stage 401 where an "open sky check without $\overline{C/N}_0$" algorithm is applied after a determination that average vehicle speed $\overline{V}$ is greater than threshold average vehicle speed $V_h$ at stage 305. If the average vehicle speed $\overline{V}$ is greater than threshold average vehicle speed $V_h$ at stage 305, the environment is preliminary determined as being open sky, and an "open sky check without $\overline{C/N}_0$" is performed at stage 401. The "open sky check without $\overline{C/N}_0$" algorithm in this implementation determines if $\overline{DOP}$ is less than a threshold average DOP ($T_{DOP2}$) and if $\overline{N}_s - \overline{N}_{s0}$ is less than a threshold number of satellites ($T_{Ns2}$). If both these conditions are met in the "open sky check without $\overline{C/N}_0$" at stage 401, the environment is determined as being open sky (stage 307). If one or both of these conditions are not met at stage 403, the environment is classified as being unknown (stage 317). In one example, an exemplary value for $T_{DOP2}$ is chosen to be 1.1 (HDOP), and an exemplary value for $T_{Ns2}$ is chosen to be 3.

It will be appreciated that while FIGS. 3 and 4 depict specific processes corresponding to exemplary implementations of the invention, one skilled in the art could vary the order of the steps, the priority given to different determinations, the threshold levels, and the determination conditions used without departing from the principles of the invention.

Figure 5:
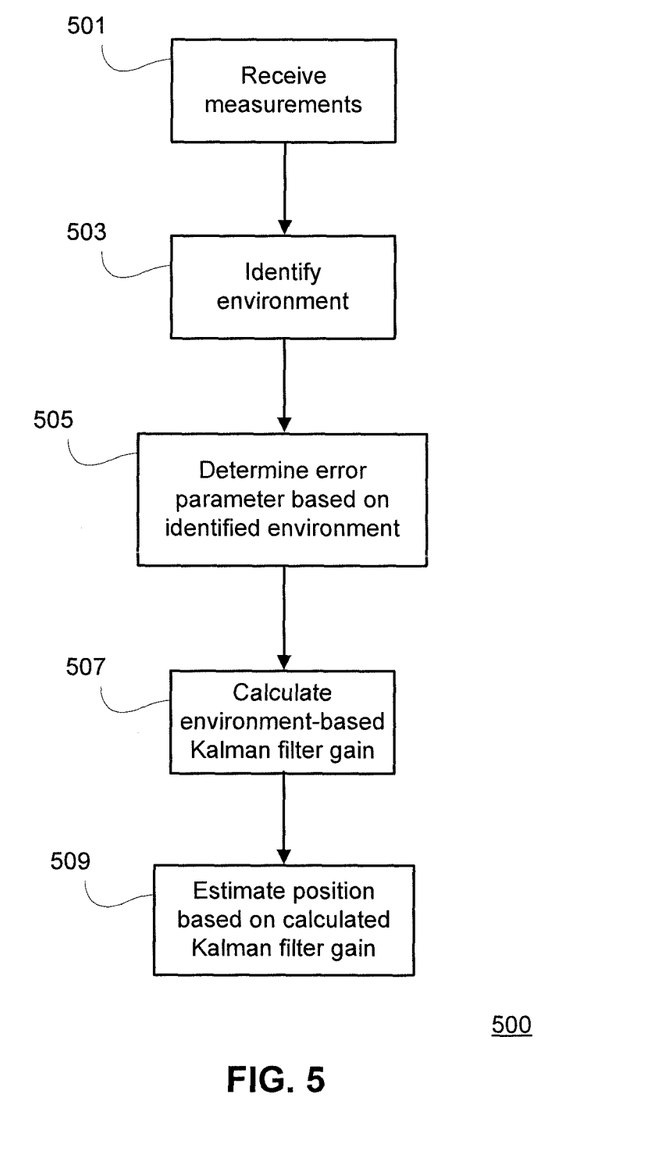
FIG. 5 is a flowchart illustrating an exemplary process for estimating a vehicle position using environment determination and a Kalman filter in an exemplary implementation.

FIG. 5 depicts an exemplary overall process 500 utilizing an environment-adaptive Kalman filter gain in a GPS/DR navigation system. At stage 501, GPS measurements, DR measurements, and related parameters are obtained. At stage 503, the environment is classified as being one an urban canyon, open sky, foliage, or unknown. At stage 505, the value of an adjusted GPS pseudorange measurement error parameter is determined. In an exemplary implementation, an initial GPS pseudorange measurement error parameter, which starts at a default value, is multiplied by an adjustment factor $C_e$. The adjustment factor $C_e$ can be chosen as one of four values based on the identification of environment—i.e., $C_{op}$ for open sky, $C_f$ for foliage, $C_{uc}$ for urban canyon, and $C_u$ for an unknown environment. In an example, $C_{op}$ may be chosen as 0.5 or less, $C_f$ may be chosen as a value between 0.6 and 0.7, $C_{uc}$ may be chosen as 2 or more, and $C_u$ may be chosen as being equal to 1. Using this adjusted GPS pseudorange measurement error parameter, the Kalman filter gain is calculated at stage 507, and the calculated Kalman filter gain is then used to estimate the position of the vehicle in the GPS/DR navigation system at stage 509.

It will be appreciated other parameters, such as a Doppler measurement parameter, that are input into the Kalman filter may also be adjusted in the manner described above with respect to the GPS pseudorange measurement error parameter. The Doppler measurement parameter, like a DOP value, can be correlated with GPS reading confidence associated with a current environment of GPS satellites, and can be used to appropriately weight the reliance on GPS readings versus the reliance on DR readings within the context of a GPS/DR integrated system.

Thus, implementations of the invention use an environment-adaptive Kalman filter gain that is calculated using a parameter such as a GPS pseudorange measurement error parameter that is adjustable based on the identified environment. It will also be appreciated, however, that the foregoing methods and implementations are merely examples of the inventive principles, and that these illustrate only preferred techniques. For example, the Kalman filter can be in any of a wide variety of traditional Kalman filter and other Kalman filter forms. Further, it will be appreciated herein that the principles discussed above are also applicable to a loose GPS/DR integration system (in which the GPS measurements used by the Kalman filter are position and velocity information instead of "raw" information such as pseudorange and Doppler information).

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for estimating position using an integrated Global Navigation Satellite System (GNSS)/dead reckoning (DR) (GNSS/DR) navigation system in a telematics-equipped vehicle, the method comprising:

determining, by a processor of the vehicle, a current environment of the vehicle from a plurality of environments based on at least one parameter, wherein each of the plurality of environments corresponds to a different weight being given to GNSS navigation and DR navigation relative to one another;

calculating, by the processor, a Kalman filter-related parameter, wherein calculating the Kalman filter-related parameter includes applying an adjustment to the weight given to GNSS navigation and DR navigation relative to one another based on the determined current environment; and estimating, by the processor, a position of the vehicle, based on the calculated Kalman filter-related parameter, utilizing a Kalman filter;

wherein the Kalman filter-parameter is an environment-based Kalman filter gain corresponding to the Kalman filter; and wherein the calculating comprises:
determining a base Kalman filter gain;
adjusting the base Kalman filter gain based on the determined current environment so as to obtain the environment-based Kalman filter gain.

2. The method of claim 1, wherein the integrated GNSS/DR navigation system is an integrated Global Positioning System (GPS)/DR navigation system.

3. The method of claim 1, wherein the plurality of environments includes at least one of: an open sky environment, an urban canyon environment, a foliage environment, and an unknown environment.

4. The method of claim 3, wherein the at least one parameter comprises at least one of: an average dilution of precision (DOP), an average vehicle speed, an average number of tracked satellites, an average number of tracked satellites in view, and an average signal strength value of tracked satellites in view.

5. The method of claim 4, wherein the determining comprises:
determining that the average vehicle speed exceeds a threshold speed; and
determining that the current environment is an open sky environment in response to the determining that the average vehicle speed exceeds the threshold.

6. The method of claim 4, wherein the determining comprises:
(a) determining that average DOP is less than a threshold DOP;
(b) determining that a difference between the average number of tracked satellites and the average number of tracked satellites in view is less than a threshold number of satellites;
(c) determining that the average signal strength of satellites in view is greater than a threshold signal strength; and
determining that the current environment is an open sky environment in response to (a), (b), and (c).

7. The method of claim 4, wherein the determining comprises:
(a) determining that average DOP is greater than or equal to a threshold DOP;
(b) determining that a difference between the average number of tracked satellites and the average number of tracked satellites in view is greater than or equal to a threshold number of satellites; and
determining that the current environment is an urban canyon environment in response to (a) and (b).

8. The method of claim 4, wherein the determining comprises:

(a) determining that average DOP is less than a threshold DOP;

(b) determining that a difference between the average number of tracked satellites and the average number of tracked satellites in view is less than a threshold number of satellites;

(c) determining that the average signal strength of satellites in view is less than or equal to a threshold signal strength; and determining that the current environment is a foliage environment in response to (a), (b) and (c).

9. A non-transitory computer-readable medium, having processor-executable instructions stored thereon for estimating position using an integrated Global Navigation Satellite System (GNSS)/dead reckoning (DR) (GNSS/DR) navigation system in a vehicle, the processor-executable instructions, when executed by a processor, causing the following steps to be performed:

determining a current environment of the vehicle from a plurality of environments based on at least one parameter, wherein each of the plurality of environments corresponds to a different weight being given to GNSS navigation and DR navigation relative to one another;

calculating a Kalman filter-related parameter, wherein calculating the Kalman filter-related parameter includes applying an adjustment to the weight given to GNSS navigation and DR navigation relative to one another based on the determined current environment; and estimating a position of the vehicle, based on the calculated Kalman filter-related parameter, utilizing a Kalman filter;

wherein the Kalman filter-parameter is an environment-based Kalman filter gain corresponding to the Kalman filter; and wherein the calculating comprises:
  determining a base Kalman filter gain;
  adjusting the base Kalman filter gain based on the determined current environment so as to obtain the environment-based Kalman filter gain.

10. The non-transitory computer-readable medium of claim 9, wherein the integrated GNSS/DR navigation system is an integrated Global Positioning System (GPS)/DR navigation system.

11. The non-transitory computer-readable medium of claim 9, wherein the plurality of environments includes at least one of: an open sky environment, an urban canyon environment, a foliage environment, and an unknown environment.

12. The non-transitory computer-readable medium of claim 11, wherein the at least one parameter comprises at least one of: an average dilution of precision (DOP), an average vehicle speed, an average number of tracked satellites, an average number of tracked satellites in view, and an average signal strength value of tracked satellites in view.

13. The non-transitory computer-readable medium of claim 12, wherein the determining comprises:

determining that the average vehicle speed exceeds a threshold speed; and determining that the current environment is an open sky environment in response to the determining that the average vehicle speed exceeds the threshold.

14. The non-transitory computer-readable medium of claim 12, wherein the determining comprises:

(a) determining that average DOP is less than a threshold DOP;

(b) determining that a difference between the average number of tracked satellites and the average number of tracked satellites in view is less than a threshold number of satellites;

(c) determining that the average signal strength of satellites in view is greater than a threshold signal strength; and determining that the current environment is an open sky environment in response to (a), (b), and (c).

15. The non-transitory computer-readable medium of claim 12, wherein the determining comprises:

(a) determining that average DOP is greater than or equal to a threshold DOP;

(b) determining that a difference between the average number of tracked satellites and the average number of tracked satellites in view is greater than or equal to a threshold number of satellites; and determining that the current environment is an urban canyon environment in response to (a) and (b).

16. The non-transitory computer-readable medium of claim 12, wherein the determining comprises:

(a) determining that average DOP is less than a threshold DOP;

(b) determining that a difference between the average number of tracked satellites and the average number of tracked satellites in view is less than a threshold number of satellites;

(c) determining that the average signal strength of satellites in view is less than or equal to a threshold signal strength; and determining that the current environment is a foliage environment in response to (a), (b) and (c).

* * * * *